FLIP-FLOP FOR GENERATING VOLTAGE-COUPLE SIGNALS

Filed Dec. 10, 1954 4 Sheets-Sheet 1

Witnesses: Gene W. Arant
E. A. Orr

INVENTOR.
DANIEL L. CURTIS
BY
Henry Heyman
ATTORNEY.

April 21, 1959 D. L. CURTIS 2,883,525

FLIP-FLOP FOR GENERATING VOLTAGE-COUPLE SIGNALS

Filed Dec. 10, 1954 4 Sheets-Sheet 2

Witnesses:
Gene W. Arant
E. A. Orr

INVENTOR.
DANIEL L. CURTIS
BY
Henry Heyman
ATTORNEY.

FLIP-FLOP FOR GENERATING VOLTAGE-COUPLE SIGNALS

Filed Dec. 10, 1954

4 Sheets-Sheet 3

Witnesses:
Gene W. Arant
E. A. Osa.

INVENTOR.
DANIEL L. CURTIS
BY
Henry Heyman
ATTORNEY.

Witnesses:
Gene W. Arant
E. A. Osn.

INVENTOR.
DANIEL L. CURTIS
BY Henry Heyman
ATTORNEY.

2,883,525

FLIP-FLOP FOR GENERATING VOLTAGE-COUPLE SIGNALS

Daniel L. Curtis, Manhattan Beach, Calif., assignor to Hughes Aircraft Company, Culver City, Calif., a corporation of Delaware Application December 10, 1954, Serial No. 474,527

11 Claims. (Cl. 250—27)

This invention relates to triggered circuits, and more particularly to a flip-flop circuit capable of receiving, storing and reproducing voltage-couple signals representing binary digits.

Bistable or flip-flop circuits having two conditions of static stability are well known in the art and have been widely used, for example, in electronic digital computers. The flip-flop circuit of the present invention finds particular utility in an electronic computer to serve substantially the same purpose as the conventional flip-flop, since either is a type of binary cell from which a stored binary digit may be sensed or detected at any time. As employed in this description, the term "multivibrator" means either a bistable circuit, or an astable circuit which has a period which is sufficiently long so that the circuit may for all practical purposes be considered as bistable; the term flip-flop means a bistable circuit including necessary input circuits for controlling the stable states thereof.

The shortcomings of conventional bistable circuits have long been recognized. One of the primary objections to this device is its low power efficiency, as the device may require of the order of 10 watts of driving power of which 95% may be dissipated as heat while as little as 5% appears in the useful output signal. When a large number of flip-flops is used in a single computer the problems of supplying adequate driving power and of providing proper cooling facilities assume very considerable proportions. Another serious objection to the conventional flip-flop is that it must be designed to provide reliable operation under conditions of both static stability and dynamic stability.

Attempts have been made to modify the conventional flop-flop or bistable circuit, but in general such modifications have resulted in increased circuit complexity or higher cost, or both, with little improvement in circuit performance. Development efforts have also been directed toward new types of binary cells or bistable devices such as magnetic cores and transistor flip-flops. See, for example, U. S. Patent 2,666,151 "Magnetic Switching Device," issued January 12, 1954, to J. A. Rajchman et al.; and "Transistor Shift Registers" by R. H. Baker et al., Proc. I.R.E., July 1954, pgs. 1152–1159. While these types of binary cells are very promising, their efficacy, reliability, and superiority have not yet been fully established.

Selection of a particular type of binary cell to be utilized in a computer necessarily dictates the type of signal to be stored within that binary cell for representing binary 1's and 0's. The type of signal to be stored and reproduced may itself be a factor of significance, however. For example, it has been pointed out that a voltage-couple signal is particularly well adapted to magnetic recording and reproduction of binary coded information. The voltage-couple signal is used in the flux-couple system of magnetic recording, which offers the particular advantage that the signal to be recorded is an alternating-current signal and accordingly the various circuits of the system need not be designed for handling direct-current signals, with a consequent simplification of the required circuitry. See U. S. Patent 2,609,143, "Electronic Computer for Addition and Subtraction" issued September 2, 1952 to G. R. Stibitz, wherein the voltage-couple signal is described at column 4, lines 3–8; and an article entitled "Universal High-Speed Digital Computers; a Magnetic Store," by F. C. Williams et al., Proc. IEE, part 2, volume 99, 1952, pgs. 94–106 (see particularly pgs. 96–97), published in London, England.

It is, therefore, an object of the invention to provide a novel flip-flop or bistable circuit for receiving, storing and reproducing voltage-couple signals representing binary digits.

Another object of the invention is to provide an improved type of flip-flop circuit having increased power efficiency and greater reliability.

A further object of the invention is to provide a novel flip-flop circuit having a transformer-coupled output circuit.

According to the present invention the traditional flip-flop requirement of static stability is dispensed with; the information content of the signal is represented in A.C. (alternating-current) form only. It thus becomes possible to utilize a transformer-coupled output circuit to match the flip-flop to its load, thereby greatly increasing overall circuit efficiency. The voltage-couple signal proposed by Stibitz and Williams has been found satisfactory for representing a binary digit in A.C. form. This signal either is at a high level during the early portion of the binary time interval and at a low level during the latter portion, or vice-versa, hence always changes from one level to the other at approximately the middle of the binary time interval. This type of signal is well adapted to A.C. transmission of binary information, but at the same time may also be used for voltage-level gating (see Fig. 12 of the patent to Stibitz).

In order that the output signal may always be made to change during the middle of the binary time interval it is necessary that the flip-flop of the present invention be triggered by a secondary clock pulse during each time interval, each secondary clock pulse being delayed with respect to a primary clock pulse by approximately half a time interval. The primary clock pulse may then be selectively applied to one input circuit or the other (or may be applied simultaneously to both although this is not necessary). If the primary clock pulse is not applied at all, the flip-flop changes its state from each time interval to the succeeding time interval; that is, if during one time interval the output signal changes from a high to a low voltage level then during the succeeding time interval it will change from low to high, or vice-versa.

There are numerous forms of flip-flop circuits which in accordance with the present invention may be employed in conjunction with a transformer-coupled output circuit to receive, store and reproduce voltage-couple signals. The invention may also be practiced by using an ordinary triggered multivibrator circuit without a transformer-coupled output circuit, although the advantage to be gained over other available circuits would then be slight. The basic requirements are that the circuit must have two states of at least temporary stability; must be easy to trigger by externally applied pulses from one state to the other; and if the circuit is an oscillator such as a free-running or astable multivibrator, then it must remain in each stable state for a period of time at least equal to the period of the secondary clock pulses.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

CIRCUIT STRUCTURE AND OPERATION

Figure 1:
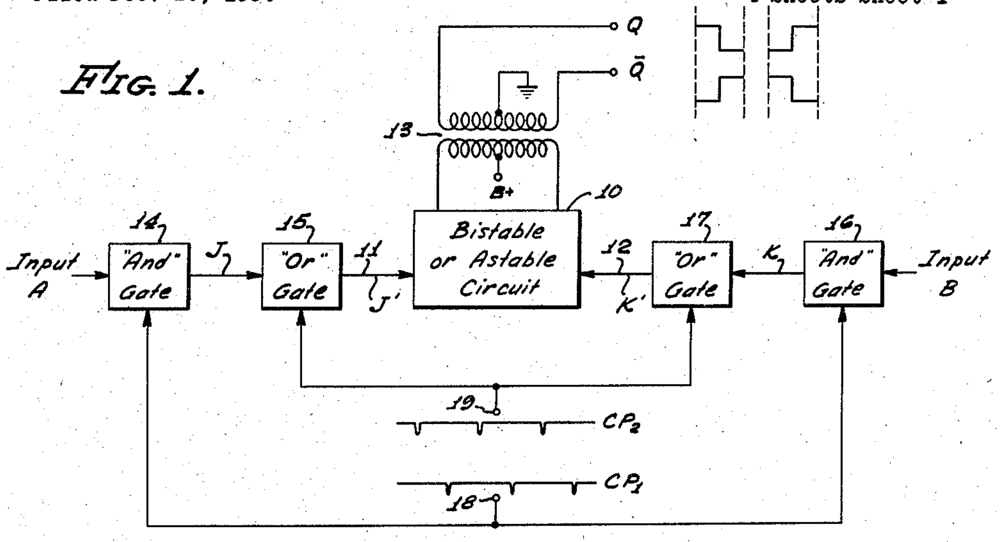
Fig. 1 is a block diagram of a flip-flop circuit according to the present invention.

Reference is now made to Fig. 1 which illustrates in block form an electronic flip-flop in accordance with the invention. A bistable or a stable circuit 10, hereafter referred to as a multivibrator, has two input terminals 11 and 12 and a transformer-coupled output circuit 13. Multivibrator 10 has two states of current conduction of at least temporary stability. The secondary winding of transformer 13, which may be center-tapped to ground, provides primary and complementary output signals Q and $\bar{Q}$, respectively. A symmetrical arrangement is provided for supplying trigger pulses to the input terminals 11 and 12; thus, an input signal A is "logically" combined with a first clock signal $CP_1$, applied through a terminal 18, in an "and" gate 14 to provide a signal J. The signal J is "logically" combined with a second clock signal $CP_2$, applied through a terminal 19, in an "or" gate 15 to provide a control signal $J^1$ impressed upon input terminal 11. In similar fashion an input signal B is combined with clock signal $CP_1$ in "and" gate 16 to provide a signal K, which is combined with the second clock signal $CP_2$ in "or" gate 17, to develop a control signal $K^1$ applied to input terminal 12. By definition, clock signal $CP_1$ is a series of primary clock pulses as illustrated for denoting binary time intervals; whereas clock signal $CP_2$ is a series of secondary clock pulses each of which is delayed with respect to its corresponding primary clock pulse by approximately one-half a time interval as shown.

The circuit is symmetrical with respect to the input terminals which receive input signals A and B, and also with respect to the output terminals at which signals Q and $\bar{Q}$ appear. It is a matter of definition, therefore, to relate the polarity of the output signals to that of the input signals. The definition which has been selected for the ensuing description is that when signal Q is at the lower of its two voltage levels, the application of a negative pulse to terminal 11 causes Q to rise to the higher of its two possible levels; whereas when signal $\bar{Q}$ is at the lower level the application of a negative pulse to terminal 12 causes signal $\bar{Q}$ to rise to the higher level.

Figure 2:
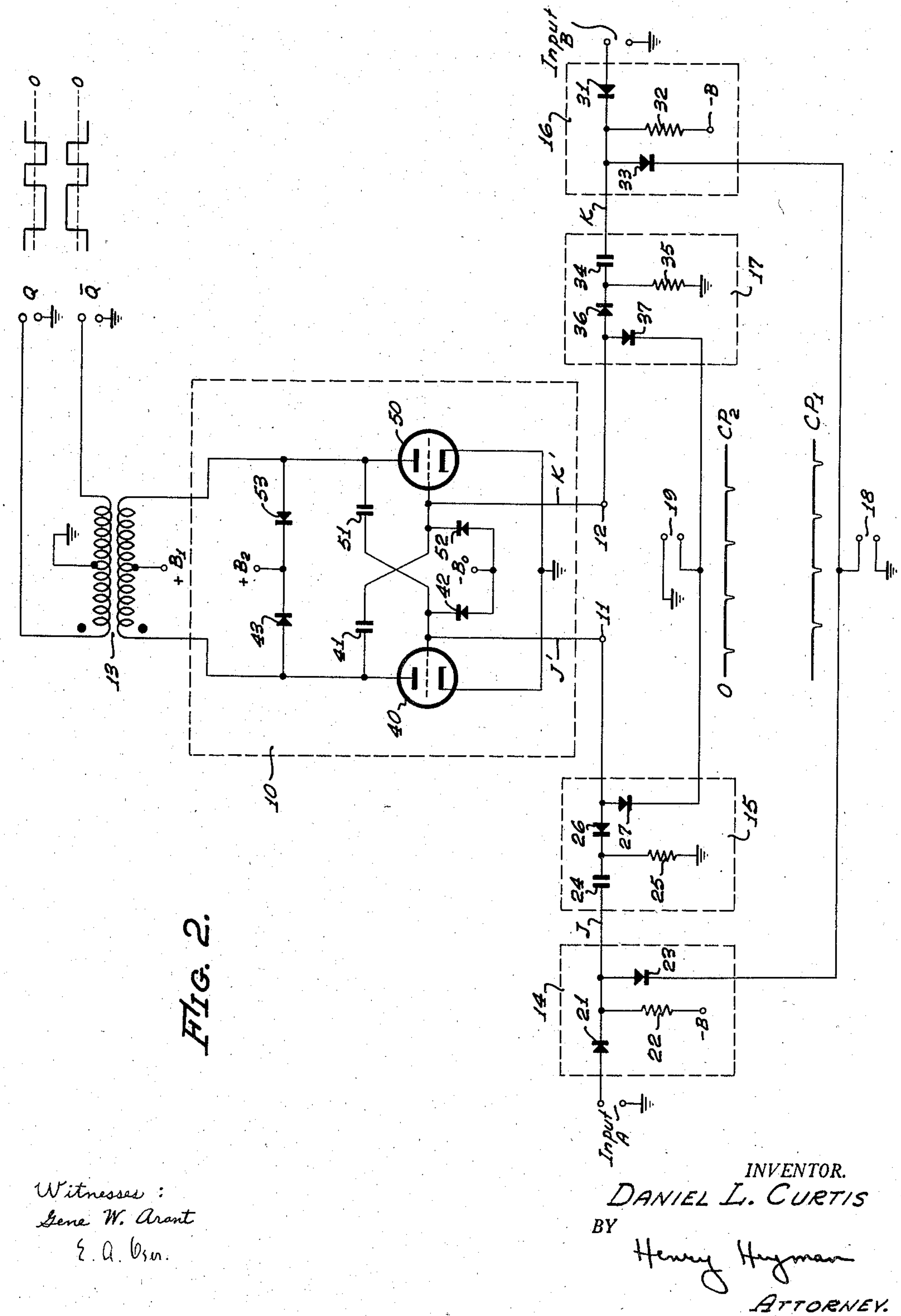
Fig. 2 is a schematic circuit diagram of one form of the circuit of Fig. 1.

Reference is now made to Fig. 2 which is a schematic circuit diagram of one flip-flop circuit according to the present invention. In the circuit of Fig. 2 the multivibrator 10, "and" gates 14 and 16, and "or" gates 15 and 17, corresponding to the blocks in Fig. 1, are respectively indicated by dotted rectangles.

"And" gate 14 includes a rectifier such as a crystal diode 21, the anode of which receives input signal A and the cathode of which is connected through a resistor 22 to a source of negative potential $-B$. A diode 23 has its anode connected to the cathode of diode 21 and its cathode connected to the ungrounded one of a pair of input terminals 18, representing the source of clock pulses $CP_1$. The output terminal of gate 14 is the cathode of diode 21, upon which signal J appears.

"And" gate 16 is of similar structure, comprising a diode 31, the anode of which receives signal B, and the cathode of which is connected through a resistor 32 to the source $-B$. A diode 33 has its cathode connected to the ungrounded terminal of source 18, and its anode connected to the cathode of diode 31, representing the output terminal upon which signal K appears.

Each of "and" gates 14 and 16 has the purpose of logically combining a voltage-level signal such as A and B with a pulse signal, or more specifically, of selectively passing a negative clock pulse $CP_1$ when the associated voltage-level signal A or B is at the higher of its two possible levels. Such gates have been disclosed and claimed in copending U.S. patent application for "Diode Pulse Gating Circuits" by Richard D. Forrest, Serial No. 327,133, filed December 20, 1952, now Patent No. 2,762,936.

"Or" gate 15 includes a capacitor 24, one terminal of which receives signal J from "and" gate 14, and the other terminal of which is connected through a resistor 25 to ground. A diode 26 has its cathode connected to the juncture of capacitor 24 and resistor 25, and its anode connected to terminal 11 of the bistable circuit 10. Another diode 27 has its cathode connected to the ungrounded one of a pair of terminals 19 representing the source of clock pulses $CP_2$.

The anode of diode 27 is connected to the anode of diode 26, forming a juncture representing the output terminal of gate 15, upon which signal $J^1$ appears. It will be noted that capacitor 24 and resistor 25 together comprise a differentiator circuit of a type commonly used in flip-flop input circuits. The primary structure of "or" gate 15 therefore comprises the two diodes 26 and 27.

"Or" circuit 17 is of similar construction and includes a capacitor 34, one terminal of which receives signal K from gate 16, the other terminal of which is connected through a resistor 35 to ground, thus providing the usual differentiator circuit. The "or" circuit operation is provided by a diode 36 having its cathode connected to the juncture of capacitor 34 and resistor 35, and a diode 37 having its cathode connected to the ungrounded terminal of source 19, the anodes of the two diodes being connected together to form the output terminal of gate 17 at which signal $K^1$ appears.

Multivibrator 10 includes a pair of cross-coupled triodes 40 and 50, the cathodes of which are grounded. The plate of triode 40 is coupled through a capacitor 41 to the grid of triode 50, and the plate of triode 50 is coupled through a capacitor 51 to the grid of triode 40. In order to prevent either grid from becoming substantially more negative than the cut-off potential, a source $-B_0$ of negative clamping voltage is provided. Clamping diodes 42 and 52 have their anodes connected to source $-B_0$ and their cathodes connected to the grids of tubes 40 and 50, respectively.

The plates of tubes 40 and 50 are connected to opposite terminals of the primary winding of transformer 13, the primary winding having a center-tap to which is connected a source $+B_1$ of plate supply voltage. In order to regulate maximum voltage swing there is provided a source $+B_2$ of clamping voltage which is more positive than the plate supply voltage $+B_1$. A pair of clamping diodes 43 and 53 have their cathodes connected to source $+B_2$ and their anodes connected to the plates of tubes 40 and 50, respectively. Hence, the maximum voltages of the plates of tubes 40 and 50 are limited. Input terminals 11 and 12 are directly connected to the control grids of tubes 40 and 50, respectively, for controlling the stable states of the circuit.

Neither grid may rise appreciably above ground potential because of biasing from the source 19, since as indicated in Fig. 2 the reference potential of clock pulses $CP_2$ is zero or ground, and since the grids are connected through diodes 27 and 37 respectively, to sourse 19 in such a manner that each diode becomes conductive if the associated grid rises above ground potential. The same biasing action is also provided by diodes 26 and 36. Nor may either grid fall appreciably below the cut-off voltage, because of the clamping action provided by source $-B_0$ and diodes 42 and 52.

The operation of multivibrator 10 when no pulses are applied to its input terminals 11 and 12 is considerably different from its operation when triggered. Accordingly, it will be advantageous to explain first the operation of the circuit when no pulses are applied thereto.

Initially at least one of the tubes will be conductive since the grid potentials are permitted to float throughout a region which includes a region where the tubes are conductive. When the circuit is first energized it is possible that both tubes may become conductive; however, due to the action of the primary winding of the transformer connected in the plate circuits, oscillatory operation will soon occur, transferring conduction alternately from one tube to the other. Let it be assumed, therefore, that conduction has just been transferred from tube 50 to tube 40. A voltage will exist across capacitor 41 corresponding to the difference in potential between the plate of tube 40 and the grid of tube 50 (with circuit values as listed below, this difference would be 175 volts), and the grid of tube 50 will be at $-B_0$ (−35 volts). Across capacitor 51 there will exist a charge corresponding to the difference between the plate potential of tube 50 and the grid potential of tube 40 (240 volts with values as listed below), and the grid of tube 40 will be at ground potential. The two grid potentials will not remain fixed at these respective values, however, i.e. the circuit is not statically stable. The grid of tube 50 will, because of current conduction through the back resistance of diodes 36 and 37, move toward ground potential. As soon as the grid of tube 50 rises above the cut-off point, space current conduction begins, the plate potential of tube 50 drops, suddenly driving the grid of tube 40 negative, cutting off current conduction in tube 40, and thus transferring conduction back to tube 50.

The frequency of oscillation in this astable operation of multivibrator 10 depends upon a great many factors and may be from several cycles per second to 50 kilocycles or higher. For the purpose of the present invention, however, the essential requirement is that the circuit shall normally remain in a stable state for a period of time greater than the period of the clock pulse. This requirement is fulfilled by multivibrator 10; thus, for the purpose of the present invention multivibrator 10 may be regarded as a bistable circuit.

While it will be understood that the circuit specifications of the flip-flop shown in Fig. 2 may vary according to the design of any particular application, the following circuit specifications for a flip-flop are included, by way of example only, suitable for a binary time interval of 6⅔ microseconds (clock frequency of 150 kilocycles), clock pulse width of 0.4 microsecond, and using a duplex triode of the 5814 type:

| | | |
|---|---|---|
| Amplitude of the clock pulses $CP_1$ and $CP_2$ | volts | 10 |
| Source $+B_1$ | do | +190 |
| Source $+B_2$ | do | +240 |
| Source $-B_0$ | do | −35 |
| Source $-B$ | do | −300 |
| Capacitors **24, 34** | micromicrofarads | 100 |
| Capacitors **41, 51** | do | 30 |
| Diodes **43, 53** | | Type 1N55B |
| Diodes **21, 31, 23, 33, 26, 36, 27, 37, 42, 52** | | Type 1N67A |
| Resistors **22, 32** | ohms | 510,000 |
| Resistors **25, 35** | do | 10,000 |
| Transformer ratio | step down | 10 to 1 |
| Inductance of transformer primary winding | henries | 2 |

In order to provide the best operation transformer 13 should have a good response at low frequencies.

Many variations may readily be made in the circuit of Fig. 2. For example, clock pulses $CP_2$ may be a series The signal $J^1$ on terminal 11 is shown as including a of positive pulses applied to both cathodes, rather than negative pulses applied to the grids as shown. The plate voltage swing might also be clamped at the lower, rather than the upper level, merely by reversing the polarities of diodes 43 and 53 and making voltage $+B_2$ less positive than voltage $B_1$; for example, in accordance with the table of values above, source $+B_2$ may have a value of +140 volts.

An important advantage of the circuit illustrated in Fig. 2 is that its capabilities may be efficiently matched to the requirements of the load. In electronic computer technology it is generally desired to drive gating circuits by means of voltage-level signals having a difference between their higher and lower levels of the order of 10 to 20 volts. At the same time it is well recognized that high efficiency of amplifiers, flip-flops, oscillators and similar circuits requires a high plate voltage swing. Transformer coupling therefore provides the means of efficiently matching these two requirements.

TRIGGER OPERATION OF THE CIRCUIT

Triggering of the circuit of Fig. 1 is achieved in response to the continuous application of the periodic negative clock pulses $CP_2$, and in response to the selective application of negative clock pulses $CP_1$ dependent on input signals A and B. Signal J has the same logical value as signal A, and the gate 14 is required only because it is assumed that signal A during successive binary time intervals represents either a binary 1 or 0 indicated by corresponding voltage levels, whereas signal J is an intermittent series of negative pulses suitable for triggering the flip-flop. In similar fashion signal K is an intermittent series of negative pulses suitable for triggering the flip-flop, and representing the same logical values as signal B.

Figure 3:
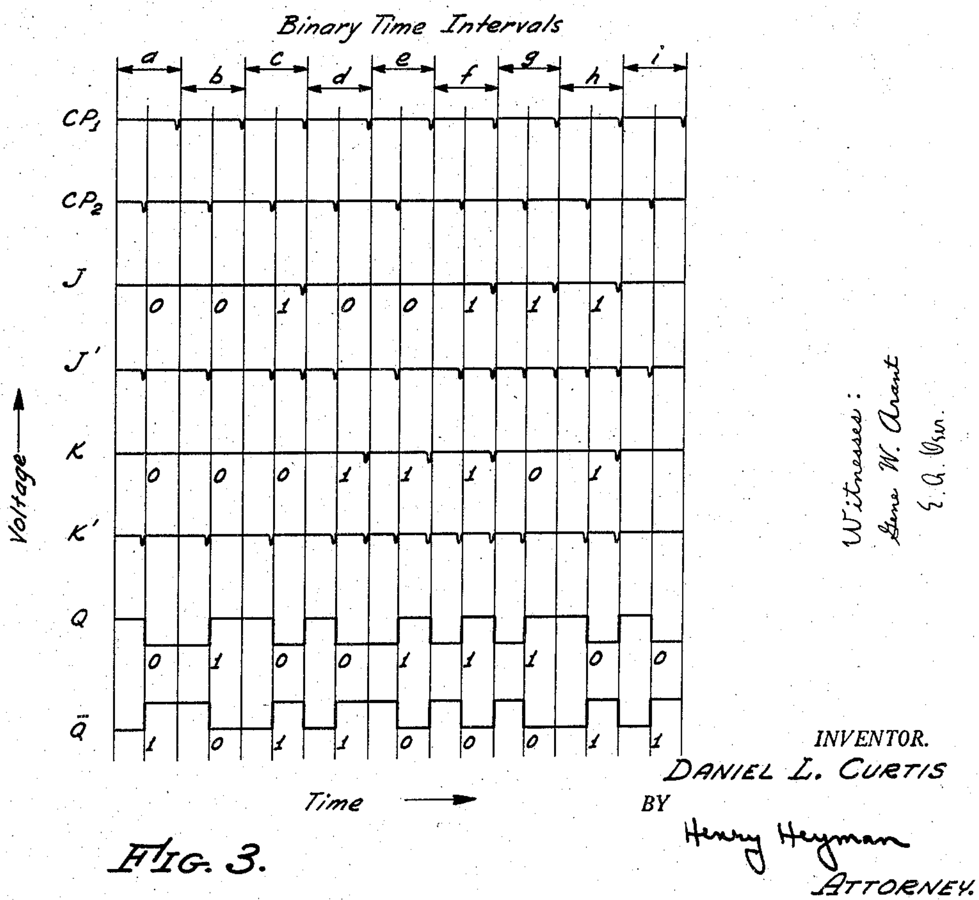
Fig. 3 is a graph of wave shapes occurring at various points of the circuit of Fig. 1.

The trigger operation of the circuit may be more clearly described with reference to Fig. 3, which illustrates voltage wave forms appearing at various points in the circuit of Fig. 1 and plotted with respect to time. In Fig. 3 the clock pulses $CP_1$, clock pulses $CP_2$, signal J, signal $J^1$, signal K, signal $K^1$, output signal Q, and complementary output signal $\bar{Q}$ representing voltages are each plotted as a function of successive binary time intervals *a, b, . . . i* as indicated.

It will be noted from Fig. 3 that a clock pulse $CP_1$ occurs during the terminal portion of each binary time interval. Clock pulses $CP_1$ may therefore be regarded as the master clock pulses for an entire computer, employed for logically sampling various voltage-level signals throughout the system at the end of each binary time interval when their values have become definitely established, and for synchronizing the operations of the entire computer. Each clock pulse $CP_2$ is delayed approximately half a time interval with respect to an associated clock pulse $CP_1$, and is particularly required for the flip-flop circuit of the invention although it may not be necessary elsewhere in the computer.

Signal J has been arbitrarily selected as having a negative pulse during time intervals *c, f, g* and *h*, and no pulse during the other time intervals. Thus the corresponding input signal A, not shown, may be a voltage-level signal having a high voltage level during time intervals *c, f, g,* and *h*, and a low level during the remaining time intervals *a, b, d, e,* and *i*. Signal K is likewise arbitrarily chosen as including negative pulses during time intervals *d, e, f,* and *h*, and no pulses during time intervals *a, b, c, g,* and *i*. For the assumption as stated above these values of signal K correspond to an input signal B having a high voltage level during time intervals *d, e, f,* and *h*, and a low voltage level during time intervals *a, b, c, g,* and *i*. Fig. 3 indicates corresponding binary 1's and 0's assigned to signals J and K during the various time intervals, where 1 corresponds to a negative pulse and 0 corresponds to no pulse.

negative pulse corresponding to each occurrence of clock pulses $CP_2$, as well as a negative pulse corresponding to each negative pulse presented by signal J. The signal $K^1$ on terminal 12 similarly includes each negative pulse $CP_2$, as well as each negative pulse presented by signal K.

Output signals Q and $\bar{Q}$ are complementary signals, hence detailed explanation will be made with respect to signal Q only. It will be noted that, since clock pulses $CP_2$ are always applied to both control grids, signal Q changes its level upon each occurrence of clock pulses $CP_2$, corresponding approximately to the middle of each binary time interval. Thus signal Q is either high during the early portion of the time interval and low during the latter portion, or vice-versa. It is convenient to employ the converse of the convention chosen by Stibitz, referred to above, i.e., the convention followed here is that a binary 1 corresponds to a signal which is high at the end of the time interval and a binary 0 to a signal which is low at the end of the time interval.

The initial value of signal Q during binary time interval *a* has been arbitrarily assumed to be 0; during succeeding time intervals, however, the value of signal Q is determined by the values of J, K and Q during each preceding time interval. Although it is not necessary to consider in detail every change in the value of signal Q illustrated by Fig. 3, it will nevertheless be helpful to discuss two selected examples. The first example is the change occurring between time intervals *a* and *b*.

During time interval *a*, signal Q is initially high but changes to a low level in response to a clock pulse $CP_2$; thus the value of signal Q corresponds to binary 0. At the end of the time interval *a* the circuit is not responsive to the clock pulse $CP_1$ since both signals J and K have binary 0 values corresponding to no pulse. Therefore, signal Q remains at its low level during the early portion of the next time interval *b*. Signal Q again changes in response to a clock pulse $CP_2$, at approximately the middle of time interval *b*, hence its value during time interval *b* corresponds to binary 1.

As a second example, the change occurring between time intervals *g* and *h* will be considered. During the latter portion of time interval *g* signal Q is at a high level. Signal J has a value of 1 corresponding to the application of clock pulse $CP_1$ to terminal 11. The J pulse has the power to change signal Q from a low to a high value. It will not cause the reverse change, however, since when signal Q is high the grid of tube 40 is already below cut-off. Signal Q therefore remains at a high level during the early portion of time interval *h* since signal *h* has a value of 0 during time interval *g*. These values of signal Q correspond to binary 1 and 0 respectively during time intervals *g* and *h*. It will be noted that in this situation the J pulse is redundant, i.e., of no effect. If signal K had a 1 value during time interval *g*, however, then signal Q would have changed to a low value at the beginning of time interval *h*; this situation being illustrated by intervals *e—f*, and *f—g*.

LOGICAL OPERATION OF THE CIRCUIT

In the design of digital electronic computers it is convenient to employ the principles of Boolean algebra to relate the logical function of the circuit to its structure, and to represent as far as practicable the time sequence of events occurring within a computer. In this connection reference is made to an article entitled, "An Algebraic Theory for Use in Digital Computer Design," by E. C. Nelson, published in Transactions of The Professional Group on Electronic Computers, I.R.E., September 1954, p. 12. Attention is particularly directed to Fig. 12 showing a flip-flop circuit, and to Equation 28 which establishes the time relationships pertaining to the operation of the conventional type of flip-flop circuit. It will be helpful to develop a similar equation defining the operation, as a logical computer element, of the flip-flop circuit of the present invention.

Reference is made to Table I below which sets forth in tabular form the relationships between $Q_n$, defined as the present state of the flip-flop, and $Q_{n-1}$, defined as the previous state of the flip-flop, as functions of signals $J_{n-1}$ and $K_{n-1}$ occurring during this previous flip-flop state. Thus Table I defines signal $Q_n$ as a function of the three binary variables $Q_{n-1}$, $J_{n-1}$, $K_{n-1}$. The table establishes eight rules corresponding to the eight possible combinations of values of these three independent variables. Thus, for example, Rule 1 represents the situation where all three variables are 0; Rule 2, where $Q_{n-1}$ and $J_{n-1}$ are 0, and $K_{n-1}$ is 1; and Rule 8, where all three are 1.

*Table I*

| Rule | $Q_{n-1}$ | $J_{n-1}$ | $K_{n-1}$ | $Q_n$ | Time Intervals |
|---|---|---|---|---|---|
| 1 | 0 | 0 | 0 | 1 | *a—b* |
| 2 | 0 | 0 | 1 | 1 | *d—e* |
| 3 | 0 | 1 | 0 | 0 | *c—d* |
| 4 | 0 | 1 | 1 | 0 | *h—i* |
| 5 | 1 | 0 | 0 | 0 | *b—c* |
| 6 | 1 | 0 | 1 | 1 | *e—f* |
| 7 | 1 | 1 | 0 | 0 | *g—h* |
| 8 | 1 | 1 | 1 | 1 | *f—g* |

Table I corresponds directly to the wave diagrams of Fig. 3, and each separately tabulated relationship or rule of Table I includes an indication of the binary time intervals of Fig. 3 to which it corresponds. For example, in Table I, Rule 3 shows values of:

$$Q_{n-1}=0$$
$$J_{n-1}=1$$
$$K_{n-1}=0$$
$$Q_n=0$$

corresponding to time intervals *c—d*, where *d* is considered as the present time interval *n* and *c* as the previous interval $(n-1)$. From reference to Fig. 3 it is seen that during time interval *c* the output signal $Q_{n-1}$ has the value 0; signal $K_{n-1}$ has the value 0; and signal $J_{n-1}$ has the value 1. The application of the $J_{n-1}$ pulse at the end of time interval *c* causes signal Q to rise from its low level to its high level, hence during the succeeding time interval *d* signal $Q_n$ again has the value 0.

In similar fashion it can be seen that the other rules of Table I correspond to the other conditions of Fig. 3 as indicated. Altogether eight logical operations are illustrated both in the wave diagram and in the table. It will be noted, however, that some of these conditions represent the application of ineffective or redundant J or K signals. More specifically, the J pulse is redundant in time intervals *f* and *g* and the K pulse is redundant in time intervals *d* and *h*.

Reference is now made to Table II which is a more simplified tabulation of the logical operation of the circuit, Table II being derived directly from Table I so as to eliminate the redundant information. The rules in Table II do not correspond to the rules of the same number in Table I. Table II is in a form indicating what is required to change the flip-flop from one given condition to another. Thus, referring to the first rule where $Q_{n-1}=0$ and it is desired that $Q_n=0$, it is necessary that $J_{n-1}$ have the value 1. This rule corresponds to both the third and fourth rules of Table I. It will be noted that Table II, Rule 1 does not specify the value of $K_{n-1}$ since the condition $J_{n-1}=1$ is both necessary and sufficient.

*Table II*

| Rule | $Q_{n-1}$ | $Q_n$ | $J_{n-1}$ | $K_{n-1}$ |
|---|---|---|---|---|
| 1 | 0 | 0 | 1 | ------- |
| 2 | 0 | 1 | 0 | ------- |
| 3 | 1 | 0 | ------- | 0 |
| 4 | 1 | 1 | ------- | 1 |

In similar fashion the second rule of Table II corresponds to the first and second rules of Table I; the third rule corresponds to the 5th and 7th rules of Table I; and the 4th rule corresponds to the 6th and 8th rules of Table I; where the conditions $J_{n-1}=0$, $K_{n-1}=0$, and $K_{n-1}=1$, respectively, are both necessary and sufficient.

From Table II it is possible to write directly a generalized equation of the type shown by Nelson. Thus:

$$Q_n=\bar{J}_{n-1}\cdot\bar{Q}_{n-1}+K_{n-1}\cdot Q_{n-1}$$

where the dot (.) represents the logical "and," and plus (+) the logical "or," and the bar (—) a complementary signal, all as defined in the Nelson article.

The above discussion and the generalized equation derived therefrom have been based upon the assumption with respect to the input signals that binary 1 corresponds to the presence of a pulse, and with respect to the binary output signal Q that binary 1 corresponds to a high voltage-level at the end of the time interval. It is readily apparent, however, that other assumptions may be made and that, in fact, there are four possible conventions which may be assumed. These possible conventions and their corresponding generalized equations representing the operation of the flip-flop circuit are shown in Table III.

*Table III*

| Rule | Input Signal=Binary 1 for— | Q=1 when level at end of interval is— | Generalized Equation |
|---|---|---|---|
| 1 | Pulse | High | $Q_n=\bar{J}_{n-1}\cdot\bar{Q}_{n-1}+K_{n-1}\cdot Q_{n-1}$ |
| 2 | Pulse | Low | $Q_n=J_{n-1}\cdot Q_{n-1}+\bar{K}_{n-1}\cdot\bar{Q}_{n-1}$ |
| 3 | No Pulse | High | $Q_n=J_{n-1}\cdot\bar{Q}_{n-1}+\bar{K}_{n-1}\cdot Q_{n-1}$ |
| 4 | No Pulse | Low | $Q_n=\bar{J}_{n-1}\cdot Q_{n-1}+K_{n-1}\cdot\bar{Q}_{n-1}$ |

It may be noted that the generalized equation corresponding to Rule 1 in Table III is the same as Nelson's Equation 28; Nelson's Equation, however, is based upon conditions which correspond to Rule 3 of Table III, and describes the logical operation of the conventional circuit, rather than the flip-flop of the present invention.

Both of the input terminals A and B in Fig. 2 may if desired be connected directly together, to control the flip-flop with a single input function. Signals J and K then have identical values during each time interval, and Rules 2, 3, 6, and 7 of Table I are inapplicable.

From the previous explanation, it will be obvious that if no pulses J and K are applied, the output signal Q will change its binary value from one time interval to the succeeding time interval. In this case, however, when it is desired to obtain the same output signal during successive time intervals, use may be made of the two output signals Q and $\bar{Q}$ by gating them so that during alternate time intervals either the output signal Q or the output signal $\bar{Q}$ is used. As a result, this gated output signal will remain at the same binary value even in the absence of an applied pulse J or K.

Any desired logical sequence of output signals may be produced by utilizing the Rules of Table III. For example, assume it were desired to utilize Rule 1 and to produce during time intervals B, C, D, E, F and G a primary output signal $Q_n$ having successive values 0, 1, 0, 0, 1, 1. In that case during time intervals A, B, D, and E the values of signal J should be 1, 0, 1 and 0 respectively, and during time intervals A, C, and F the values of signal K should be 0, 0 and 1 respectively, as will be obvious from an inspection of Table II.

FIRST ALTERNATIVE CIRCUIT

Figure 4:
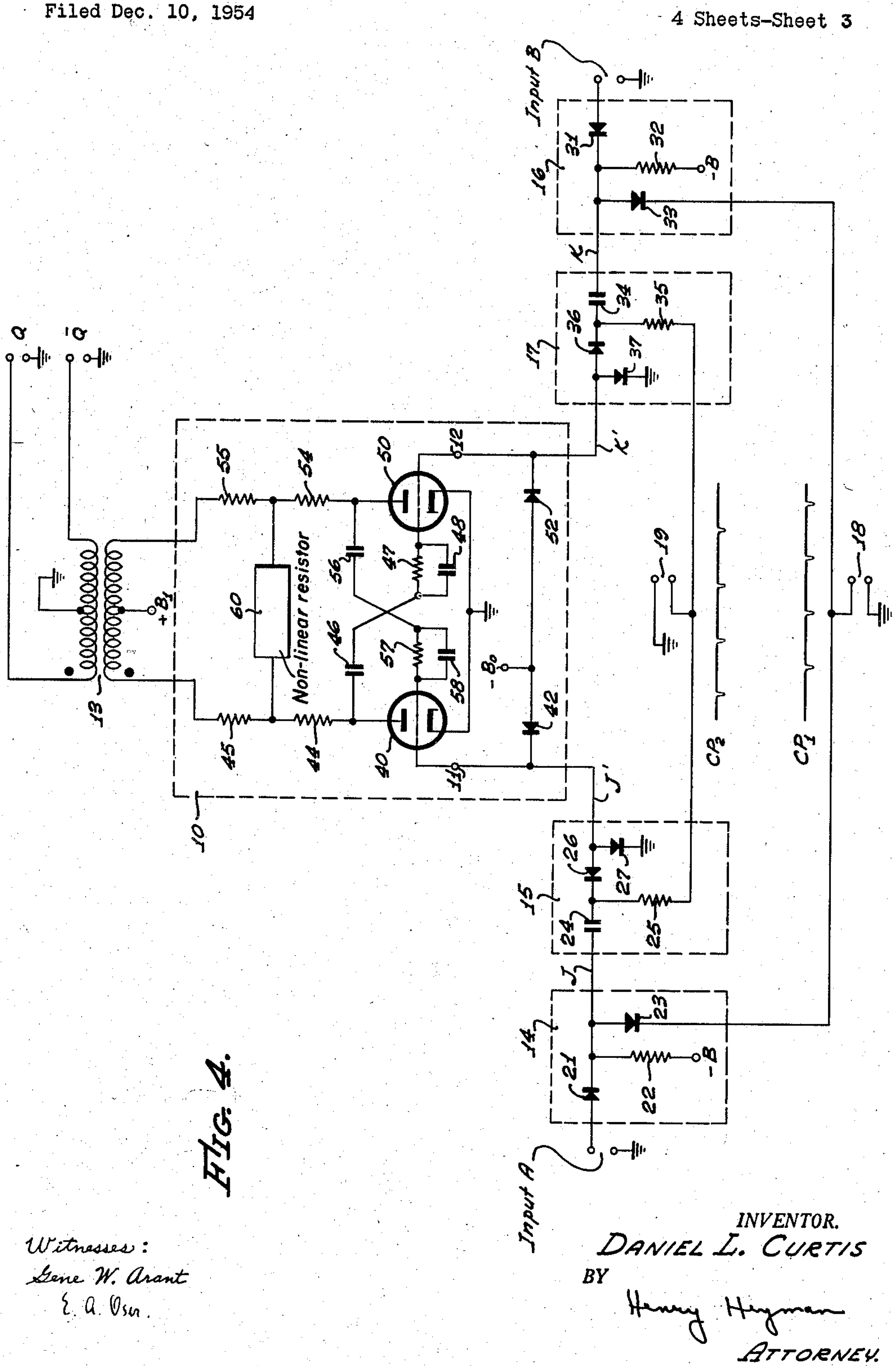
Fig. 4 is a schematic circuit diagram of another form of the circuit of Fig. 1.

Reference is now made to Fig. 4 which is a schematic circuit diagram of a first modification of the flip-flop circuit according to the present invention. The various portions of the circuit are again indicated by means of appropriate dotted rectangles.

It is not necessary to describe the circuit of Fig. 4 in detail since it is the same as Fig. 2 with certain exceptions which will be specifically pointed out. The principal change is in the structure of multivibrator 10; another change is introduced in the manner of applying clock pulses $CP_2$. The latter innovation will be explained first.

In the circuit of Fig. 4 the clock pulses $CP_2$ from source 19 are applied through resistors 25 and 35, rather than through diodes 27 and 37 as in Fig. 2. The purpose of this change is to provide additional isolation between clock pulse source 19 and the grids of tubes 40 and 50, so as to preclude any false triggering action. It is therefore desirable to provide clock pulses $CP_2$ having greater amplitude than employed in the circuit of Fig. 2. A more satisfactory compromise between isolation, and trigger sensitivity, may also be achieved by decreasing the size of resistors 25 and 35.

Since clock pulses $CP_2$ are no longer gated through diodes 27 and 37, those diodes function only for the purpose of clamping the respective grids to prevent their potentials from rising above ground by connecting the cathodes of diodes 27, 37 to ground. The same clamping action is also provided by grid-cathode current conduction in tubes 40 and 50, hence the diodes 27 and 37 may be dispensed with in the circuit of Fig. 4 without substantially affecting the output wave form.

Multivibrator 10 again includes triodes 40 and 50, the cathodes of which are grounded, and the grids of which are clamped to the source $-B_0$ through diodes 42, 52 as in Fig. 2. The cross-coupling networks and the structure of the plate circuits are considerably different from the circuit of Fig. 2, however, as will now be explained.

Each cross-coupling network includes a capacitor in series with a parallel resistor-capacitor combination. Thus, a capacitor 46 has one terminal connected to the plate of tube 40 and the other terminal connected through a resistor 47 to the grid of tube 50. A capacitor 48 connected in parallel with resistor 47 completes the first cross-coupling network. From the plate of tube 50 a capacitor 56 is connected through a resistor 57, which has a capacitor 58 connected in parallel therewith, to the grid of tube 40, comprising the second cross-coupling network. These two cross-coupling networks are symmetrical, hence a discussion of the circuit values and mode of operation of one of them will suffice.

In the first cross-coupling network, for example, capacitor 48 operates as a speed-up capacitor, like capacitor 41 of Fig. 2, as is conventional. Its value should be large compared to the capacitance which appears looking into the grid of tube 50, but not so large as to overload the plate of tube 40. The purpose of resistor 47 is to provide a constant capacitor charging or discharging current for biasing the grid of tube 50 either at 0 or at $-B_0$, respectively, during appropriate portions of the operating cycle. The current supplied by resistor 47 must be sufficient to overcome current drain through the back bias resistance of diodes 36 and 37 when the grid is low, and of diode 52 when the grid is high, and must in addition provide a sufficient biasing current to insure stability. Capacitor 46 is selected to be sufficiently large so that, while being drained of its charge through resistor 47, the potential across it will not vary substantially during a clock pulse period.

The cross-coupling networks of the circuit of Fig. 4 provide more reliable operation than does the circuit of Fig. 2, by precluding false triggering of the circuit in response to pulses having less than a predetermined amplitude and energy content.

Multivibrator 10 also includes a first pair of isolating resistors 44 and 54, each having one terminal connected to the plates of tubes 40 and 50 respectively; a nonlinear resistance element indicated schematically at 60 having its two ends connected to the opposite ends of resistors 44 and 54; and a second pair of isolating resistors 45 and 55 each having one end connected to opposite ends of the element 60, and the other end connected to opposite terminals of the primary winding of transformer 13. The purpose of resistance element 60 is to limit the maximum plate voltage swing in somewhat the same manner as do diodes 43 and 53 of Fig. 2. Before explaining its function in greater detail it will be helpful to consider suitable characteristics which may be chosen for element 60.

Non-linear resistance elements are described, for example, in an article by Frank R. Stansel entitled "The Characteristics and Some Applications of Varistors" in Proc. I.R.E. April 1951, at pgs. 342 to 358. Attention is also directed to an article by F. Ashworth et al., entitled "Silicon Carbide Non-Ohmic Resistors," Journal of The Institute of Electrical Engineers, vol. 93, Part I, pg. 385–401, 1946. The characteristics of silicon carbide resistors are also described in "Thyrite (Resistance Material)" Catalog GEA–4244B, at p. 56, published by the General Electric Company.

In general element 60 should be bilaterally conductive according to a substantially symmetrical relationship, having an incremental resistance which decreases very rapidly for applied voltages above a predetermined level, hereafter referred to as the clamping voltage. In the circuit of Fig. 4 satisfactory operation has been obtained by using a silicon carbide resistor element. Satisfactory results may also be obtained by using a product which is commercially available under the trademark of "Thyrite, Type K," of General Electric Company, Designation No. 355083G1.

Resistors 44 and 54 comprise a first attenuation loop to reduce the voltage amplitude and energy content of any disturbance originating in the load circuit which may reach the plates of multivibrator 10. These resistors also make it easier for the circuit to respond to a normally applied trigger pulse, inasmuch as if the resistor element 60 were connected directly at the plates it would have too strong a clamping effect and would tend to inhibit normal triggering action.

Resistors 45 and 55 provide a second attenuation loop for diminishing the voltage amplitude and content of any disturbance arising in the load circuit which might reach the plates of multivibrator 10. These resistors also provide critical damping for the transformer primary which would otherwise tend to exhibit a ringing effect.

In the circuit of Fig. 4 the use of resistor element 60 permits a maximum plate voltage swing of approximately 250 volts, whereas in the circuit of Fig. 2 the clamping diodes permit a voltage swing of only about 100 volts. The use of element 60 obviates the need for a separate clamping power supply, and furthermore, insures consistent circuit operation which is not dependent upon the availability of fixed power supply potentials. It may also be noted that a thyrite element, for example, is more reliable and has longer life expectancy than crystal diodes.

The increased amplitude of the plate voltage swing in the circuit of Fig. 4 makes it possible to also increase the turn ratio of the transformer if it is desired to provide a fixed voltage swing in the secondary circuit. It is to be noted that whereas the circuit of Fig. 4 may be utilized to provide the same output voltage swing as the circuit of Fig. 2, the total output power available is increased in direct proportion to the increase in amplitude of the plate voltage swing. The circuit of Fig. 4 provides further improved operation over the circuit of Fig. 2 inasmuch as it is capable of being operated at high power levels without fear of spurious triggering of the circuit in response to a voltage fluctuation originating in the load circuit.

While it will be understood that the circuit specifications of the flip-flop shown in Fig. 4 may vary according to the design of any particular application, the following circuit specifications for a flip-flop are included, by way of example only, suitable for a binary time interval of 6⅔ micro-seconds (clock frequency of 150 kilocycles), clock pulse width of 0.4 micro second, and using a duplex triode of the 5814 type:

| | | |
|---|---|---|
| Amplitude of clock pulses $CP_1$ | volts | 10 |
| Amplitude of clock pulses $CP_2$ | Do | 30 |
| Source $+B_1$ | Do | +300 |
| Source $-B_0$ | Do | −35 |
| Source −B | Do | −300 |
| Capacitors 24, 34 | micromicrofarads | 100 |
| Capacitors 48, 58 | Do | 36 |
| Capacitors 46, 56 | microfarads | 0.0047 |
| Diodes 21, 31, 23, 33, 26, 36, 27, 37, 42, 52 | Type | 1N67A |
| Resistors 47, 57 | ohms | 220,000 |
| Resistors 44, 54 | Do | 2,000 |
| Resistors 45, 55 | Do | 5,000 |
| Resistors 22, 32 | Do | 510,000 |
| Resistors 25, 35 | Do | 5,000 |
| Transformer ratio | step down | 20 to 1 |
| Inductance of transformer primary winding | henries | 2 |
| Clamping voltage of element 60 | volts | 250 |
| Power rating of element 60 | watts | 1 |
| Dynamic resistance, during clamping, of element 60 | ohms | 5,000 |

SECOND ALTERNATIVE CIRCUIT

Figure 5:
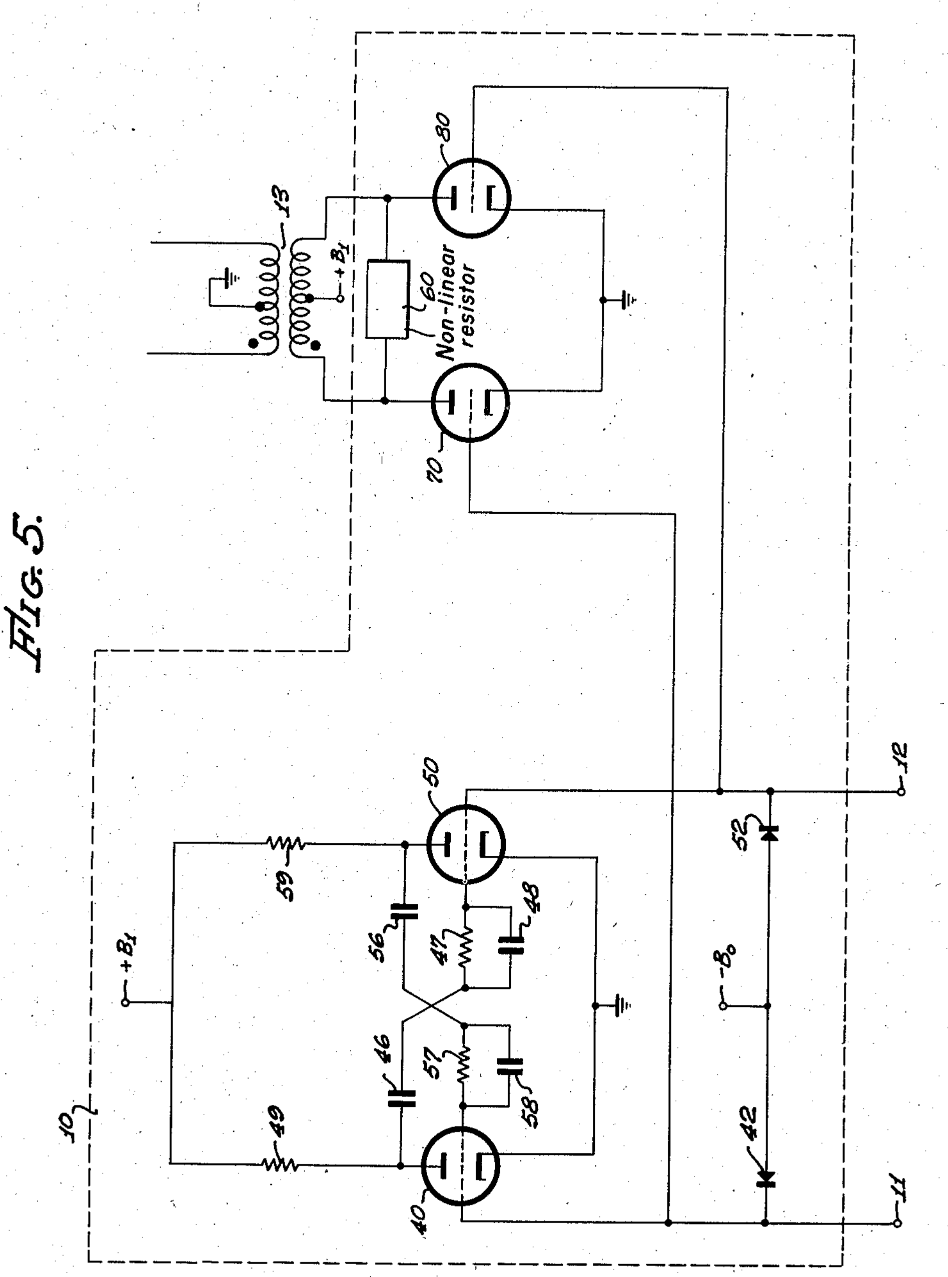
Fig. 5 is a schematic circuit diagram of another form of the multivibrator circuit included in the circuit of Fig. 4.

Reference is now made to Fig. 5 which is a schematic circuit diagram of a second alternative form of multivibrator 10 of Fig. 4.

Multivibrator 10 includes, in addition to tubes 40 and 50, a second pair of tubes 70 and 80 which may be triodes as shown and which are employed as amplifiers for further isolating the output circuit from the grids of tubes 40 and 50. Thus the basic astable circuit comprising tubes 40 and 50 includes the same cross-coupling networks, and the same clamping of the grids to source $-B_0$ as does the circuit of Fig. 4. In addition, load resistors 49 and 59 are connected between source $+B_1$ and the plates of tubes 40 and 50, respectively. The source $+B_1$ may have a potential of 300 volts as in Fig. 4, and a satisfactory value for resistors 49 and 59 is 10,000 ohms.

The grids of tubes 70 and 80 are directly connected to the grids of tubes 40 and 50, respectively, the connection being preferably made by means of short leads to keep stray capacitance at a minimum. The cathodes of tubes 70 and 80 are grounded. The plates of tubes 70 and 80 are respectively connected to opposite ends of the primary winding of transformer 13. A center-tap in the primary winding is connected to source $+B_1$, thus supplying power to tubes 70 and 80 to permit them to amplify the voltage changes appearing upon the grids of tubes 40 and 50, respectively. Non-linear resistance element 60 is connected directly between the plates of tubes 70 and 80 for the purpose of establishing the maximum voltage swing applied to the primary winding of the transformer.

The principal advantage of the circuit of Fig. 5, is that the output circuit is completely shielded from the grids of tubes 40 and 50, except for the grid-to-plate capacitance of tubes 70 and 80 which is so small that it may be disregarded. Thus the maximum available output power may be supplied to a load circuit without danger of false triggering of the flip-flop. Another advantage is rapid response, since the basic astable circuit is isolated from reflected load capacitance which would tend to slow down the transition from one state to the other.

Other modifications of the circuit of Fig. 5 may be employed if desired. For example, a single amplifier tube might be employed in lieu of tubes 70 and 80 to drive the output circuit.

It is therefore apparent that the present invention provides a novel class of circuits which may be selectively controlled by means of applied trigger pulses for producing voltage-couple output signals, and which achieve a high degree of power efficiency by taking advantage of alternating-current coupling methods. Many modifications and variations of the circuits specifically shown and described will be readily apparent to those skilled in the art.

What is claimed as new is:

1. An electronic flip-flop for producing during successive time intervals a voltage-couple output signal having during each time interval either a relatively high voltage level during the beginning portion and a relatively low voltage level during the end portion thereof, or vice-versa, said flip-flop comprising: a triggerable circuit having two states of current conduction of at least temporary stability, circuit means coupled to said triggerable circuit for developing an output signal, said output signal having a high voltage level corresponding to one of said states and a low voltage level corresponding to the other state; first means coupled to said triggerable circuit for applying thereto a first trigger pulse substantially during the middle of each time interval, said triggerable circuit being responsive to said first trigger pulse to change from one state of conduction to the other; and second means coupled to said triggerable circuit for applying thereto at the ends of selected time intervals a second trigger pulse, said triggerable circuit being arranged to normally maintain the same state of conduction throughout the end portion of a given time interval and the beginning portion of the next interval, and being responsive to said second trigger pulse to change its state of conduction at the beginning of the next time interval.

2. The flip-flop defined in claim 1 wherein said circuit means includes a transformer-coupled output circuit for developing said output signal.

3. An electronic flip-flop for producing during successive time intervals a voltage-couple output signal having either a relatively high voltage level during the beginning portion of a time interval and a relatively low voltage level during the end portion thereof, or vice-versa, said flip-flop comprising: a triggerable circuit having two states of current conduction of at least temporary stability, one state corresponding to the high level of the output signal and the other state to the low level, and including first and second trigger input terminals; first means coupled to said triggerable circuit for applying thereto a first trigger pulse substantially during the middle of each time interval, said triggerable circuit being responsive to said first trigger pulse to change from one of said states to the other; and second means coupled to said input terminals for selectively applying a second trigger pulse to said input terminals at the ends of selected time intervals, said triggerable circuit being normally operative to maintain the same state throughout the end portion of a given time interval and the beginning portion of the next, being responsive at the beginning of the next time interval to change from said one state to said other state when said second trigger pulse is applied to said first input terminal, and being responsive at the beginning of the next time interval to change from said other state to said one state when said second trigger pulse is applied to said second input terminal.

4. The flip-flop defined in claim 3 wherein said triggerable circuit also includes a pair of cross-coupled tubes, each having a grid, a cathode, and a plate, said grids being respectively connected to said first and second trigger input terminals; an output transformer having primary and secondary windings, said primary winding having two ends respectively coupled to said plates, and a tap on an intermediate point thereof; and means for applying a direct-current potential between said tap and a point of reference potential.

5. An electronic flip-flop for producing during successive time intervals a voltage-couple output signal, said flip-flop comprising: a triggered circuit having two stable states of conduction; first means coupled to said triggered circuit for triggering said circuit from one of said states to the other substantially during the middle of each time interval; second means coupled to said triggered circuit for applying thereto during the terminal portion of each time interval a first binary control signal J including pulses adapted to trigger said circuit, and corresponding to binary 1; third means coupled to said triggered circuit for applying thereto during the terminal portion of each time interval a second control signal K including pulses adapted to trigger said circuit, and corresponding to binary 1; and circuit means for developing an output signal Q having low and high voltage levels, said output signal being defined by the equation;

$$Q_n=\bar{J}_{n-1}\cdot\bar{Q}_{n-1}+K_{n-1}\cdot Q_{n-1}$$

where the dot (.), plus (+) and bar (—) respectively indicate the logical "and" function, the logical "or" function, and a complementary signal; where the subscript $n$ indicates a particular time interval and $(n-1)$ indicates the preceding time interval; and where the binary value of Q is defined to be 1 corresponding to a low voltage level during the beginning portion of a time interval and a high voltage level during the end portion, and 0 corresponding to a high voltage level during the beginning portion of a time interval and a low voltage level during the end portion.

6. In combination: a triggerable circuit having first and second states of current conduction of at least temporary stability, and first and second input circuits; first means coupled to said triggerable circuit for applying periodic trigger pulses thereto, said triggerable circuit being responsive to said trigger pulses for changing from one of said stable states to the other; second means coupled to said first input circuit for selectively applying a first control pulse thereto at times intermediate the application of said trigger pulses, said triggerable circuit being responsive to said first control pulse for changing from said first to said second state; third means coupled to said second input circuit for selectively applying a second control pulse thereto at times intermediate the application of said trigger pulses, said triggerable circuit being responsive to said second control pulse for changing from said second to said first state whereby said first control pulse will be ineffective to change the state of said triggerable circuit when said triggerable circuit is in said second state and whereby said second control pulse will be ineffective to change the state of said triggerable circuit when said triggerable circuit is in said first state; and an output transformer coupled to said triggerable circuit for producing voltage-couple output signals.

7. An electronic flip-flop for producing during successive time intervals a voltage-couple output signal having either a relatively high voltage level during the beginning portion of a time interval and a relatively low voltage level during the end portion thereof, or vice-versa, said flip-flop comprising: a triggerable circuit having two states of current conduction of at least temporary stability, one state corresponding to the high level of the output signal and the other state to the low level, said triggerable circuit comprising first and second tubes, each having a grid and a plate, a coupling network connecting the plate of each tube with the grid of the other, and means for limiting the maximum voltage swing of each of said plates; first means coupled to said triggerable circuit for applying thereto a first trigger pulse substantially during the middle of each time interval, said triggerable circuit being responsive to said first trigger pulse to change from one of said states to the other; and second means coupled to the grid of said first tube for applying thereto at the end of selected time intervals a second trigger pulse, said triggerable circuit being normally operative to maintain the same state throughout the end portion of each time interval and the beginning of the next, and being responsive at the beginning of the next time interval to change from said one state to said other state when said second trigger pulse is applied to the grid of said first tube.

8. An electronic flip-flop for producing during successive time intervals a voltage-couple output signal having either a relatively high voltage level during the beginning portion of a time interval and a relatively low voltage level during the end portion thereof, or vice-versa, said flip-flop comprising: a triggerable circuit having two states of current conduction of at least temporary stability, one state corresponding to the high level of the output signal and the other state to the low level, said triggerable circuit comprising first and second tubes, each having a grid and a plate, a coupling network connecting the plate of each tube with the grid of the other, means for limiting the maximum voltage swing of each of said plates, and an output transformer; first means coupled to said triggerable circuit for applying thereto a first trigger pulse substantially during the middle of each time interval, said triggerable circuit being responsive to said first trigger pulse to change from one of said states to the other; second means coupled to the grid of said first tube for applying thereto at the end of selected time intervals a second trigger pulse; and third means coupled to the grid of said second tube for applying thereto at the end of selected time intervals said second trigger pulse, said triggerable circuit being normally operative to maintain the same state throughout the end portion of a given time interval and the beginning of the next, being responsive at the beginning of the next time interval to change from said one state to said other state when said second trigger pulse is applied to the grid of said first tube, and being responsive at the beginning of the next time interval to change from said other state to said one state when said second trigger pulse is applied to the grid of said second tube.

9. In combination, a triggerable circuit comprising first and second tubes, each having a grid and a plate, a coupling network connecting the plate of each tube with the grid of the other, an inductance coil coupled between said plates, and means coupled between said plates for limiting the maximum voltage swing on each of said plates, said triggerable circuit having a first state of current conduction corresponding to a high voltage on the plate of said first tube and a low voltage on the plate of said second tube, and a second state of current conduction corresponding to a high voltage on the plate of said second tube and a low voltage on the plate of said first tube; first means coupled to said triggerable circuit for applying periodic trigger pulses thereto, said triggerable circuit being responsive to said trigger pulses for changing its state; second means coupled to the grid of said first tube for selectively applying a first control pulse thereto at times intermediate the application of said trigger pulses, said triggerable circuit being responsive to said first control pulse for changing from said first to said second state; and third means coupled to the grid of said second tubes for selectively applying a second control pulse thereto at times intermediate the application of said trigger pulses, said triggerable circuit being responsive to said second control pulse for changing from said second to said first state, whereby voltage-couple output signals appear across said coil.

10. The combination defined in claim 9 wherein said coupling network includes a first capacitor having a relatively large capacitance and having one terminal connected to the plate, a resistor connected between the grid and the other terminal of said capacitor, and a second capacitor having a relatively small capacitance and connected in parallel with said resistor; said means coupled between said plates includes a non-linear resistance element having substantially symmetrical bilateral conducting characteristics and displaying an incremental resistance which progressively decreases with increases in applied voltage; and said first means includes a source of periodic trigger pulses, a first diode having its anode connected to the grid of said first tube, a first resistor connected between said source and the cathode of said first diode, a second diode having its anode connected to the grid of said second tube, and a second resistor connected between said source and the cathode of said second diode.

11. In a digital computer, a triggerable circuit capable of assuming either of two distinct states and producing an electrical output signal continuously representative of its current state, first means coupled to said triggerable circuit for periodically changing the state of said triggerable circuit from one of said two distinct states to the other thereby to produce corresponding periodic alternations in the value of said electrical output signal, and second means operable for selectively changing the state of said triggerable circuit at times intermediate said periodic changes thereby to control the binary information represented by said electrical output signal.

References Cited in the file of this patent

UNITED STATES PATENTS

| | | |
|---|---|---|
| 2,157,533 | Geiger | May 9, 1939 |
| 2,422,449 | Usselman | June 17, 1947 |
| 2,502,687 | Weiner | Apr. 4, 1950 |
| 2,644,887 | Wolfe | July 7, 1953 |
| 2,724,104 | Wild | Nov. 15, 1955 |

FOREIGN PATENTS

| | | |
|---|---|---|
| 478,945 | Canada | Nov. 27, 1951 |

OTHER REFERENCES

Electronics, vol. 25, February 1952, pages 101–103, Inexpensive Squarewave Generator, by G. W. Gray, page 103.

UNITED STATES PATENT OFFICE

CERTIFICATE OF CORRECTION

Patent No. 2,883,525 April 21, 1959

Daniel L. Curtis

It is hereby certified that error appears in the printed specification of the above numbered patent requiring correction and that the said Letters Patent should read as corrected below.

Column 6, line 1, strike out "The signal "J1 on terminal 11 is shown as including a" and insert the same in column 7, line 1, before "negative".

Signed and sealed this 15th day of December 1959.

(SEAL)
Attest:

KARL H. AXLINE
Attesting Officer

ROBERT C. WATSON
Commissioner of Patents